US008838976B2

(12) United States Patent
Etchegoyen

(10) Patent No.: US 8,838,976 B2
(45) Date of Patent: Sep. 16, 2014

(54) WEB CONTENT ACCESS USING A CLIENT DEVICE IDENTIFIER

(75) Inventor: Craig S. Etchegoyen, Irvine, CA (US)

(73) Assignee: Uniloc Luxembourg S.A., Luxembourg (LU)

( * ) Notice: Subject to any disclaimer, the term of this patent is extended or adjusted under 35 U.S.C. 154(b) by 699 days.

(21) Appl. No.: 12/703,470

(22) Filed: Feb. 10, 2010

(65) Prior Publication Data

US 2010/0229224 A1    Sep. 9, 2010

Related U.S. Application Data

(60) Provisional application No. 61/151,449, filed on Feb. 10, 2009.

(51) Int. Cl.
*H04L 9/32* (2006.01)
*H04L 29/06* (2006.01)
*H04L 29/08* (2006.01)
*G06F 21/73* (2013.01)
*G06F 21/31* (2013.01)

(52) U.S. Cl.
CPC ............ *H04L 63/102* (2013.01); *H04L 67/306* (2013.01); *G06F 2221/2129* (2013.01); *H04L 67/02* (2013.01); *G06F 21/73* (2013.01); *H04L 67/303* (2013.01); *G06F 21/31* (2013.01)
USPC .................... 713/176; 726/5; 726/7; 713/168

(58) Field of Classification Search
None
See application file for complete search history.

(56) References Cited

U.S. PATENT DOCUMENTS

| 4,351,982 A | 9/1982 | Miller et al. |
| 4,658,093 A | 4/1987 | Hellman |
| 4,704,610 A | 11/1987 | Smith et al. |
| 4,796,220 A | 1/1989 | Wolfe |
| 5,210,795 A | 5/1993 | Lipner et al. |

(Continued)

FOREIGN PATENT DOCUMENTS

| AU | 678985 | 6/1997 |
| EP | 1 637 958 | 3/2006 |

(Continued)

OTHER PUBLICATIONS

S. Devadas, et al. "Physical Unclonable Functions and Applications," MIT, Feb. 6, 2007, Retrieved on Jul. 24, 2012, Online: http://people.csail.mit.edu/rudolph/Teaching/Lectures/Security/Lecture-Security-PUFs-2.pdf.*

(Continued)

*Primary Examiner* — Kaveh Abrishamkar
*Assistant Examiner* — Robert Leung
(74) *Attorney, Agent, or Firm* — Sean D. Burdick

(57) ABSTRACT

Systems and methods are provided for controlling access to online services. For example, the system may include an application running on a user computer (130) that collects platform data (e.g. physical device parameters) and generates a machine fingerprint (stage 602). The computer (130) may send the machine fingerprint to the authentication server (110). The server (110) may associate the received machine fingerprint with the appropriate online account information received from a host server (120) or the like (stage 604). The authentication server (110) may send the appropriate registration status signal to the host server (120), which in turn may update the online profile information to include the user's registration status (stage 606).

13 Claims, 10 Drawing Sheets

(56) References Cited

U.S. PATENT DOCUMENTS

| | | |
|---|---|---|
| 5,291,598 A | 3/1994 | Grundy |
| 5,414,269 A | 5/1995 | Takahashi |
| 5,418,854 A | 5/1995 | Kaufman et al. |
| 5,440,635 A | 8/1995 | Bellovin et al. |
| 5,490,216 A | 2/1996 | Richardson, III |
| 5,666,415 A | 9/1997 | Kaufman |
| 5,745,879 A | 4/1998 | Wyman |
| 5,754,763 A | 5/1998 | Bereiter |
| 5,790,664 A | 8/1998 | Coley et al. |
| 5,925,127 A | 7/1999 | Ahmad |
| 5,974,150 A | 10/1999 | Kaish et al. |
| 6,009,401 A | 12/1999 | Horstmann |
| 6,044,471 A | 3/2000 | Colvin |
| 6,138,155 A | 10/2000 | Davis et al. |
| 6,148,407 A * | 11/2000 | Aucsmith ................. 726/16 |
| 6,158,005 A | 12/2000 | Bharathan et al. |
| 6,167,517 A | 12/2000 | Gilchrist et al. |
| 6,173,283 B1 | 1/2001 | Kasso et al. |
| 6,195,447 B1 | 2/2001 | Ross |
| 6,230,199 B1 | 5/2001 | Revashetti et al. |
| 6,233,567 B1 | 5/2001 | Cohen |
| 6,243,468 B1 | 6/2001 | Pearce et al. |
| 6,294,793 B1 | 9/2001 | Brunfeld et al. |
| 6,330,670 B1 | 12/2001 | England et al. |
| 6,449,645 B1 | 9/2002 | Nash |
| 6,536,005 B1 | 3/2003 | Augarten |
| 6,754,665 B1 | 6/2004 | Futagami et al. |
| 6,785,825 B2 | 8/2004 | Colvin |
| 6,859,793 B1 | 2/2005 | Lambiase |
| 6,920,567 B1 | 7/2005 | Doherty et al. |
| 6,976,009 B2 | 12/2005 | Tadayon et al. |
| 6,985,953 B1 | 1/2006 | Sandhu et al. |
| 6,993,580 B2 | 1/2006 | Isherwood et al. |
| 7,032,110 B1 | 4/2006 | Su et al. |
| 7,069,440 B2 | 6/2006 | Aull |
| 7,069,595 B2 | 6/2006 | Cognigni et al. |
| 7,085,741 B2 | 8/2006 | Lao et al. |
| 7,188,241 B2 | 3/2007 | Cronce et al. |
| 7,203,966 B2 | 4/2007 | Abburi et al. |
| 7,206,765 B2 | 4/2007 | Gilliam et al. |
| 7,272,728 B2 | 9/2007 | Pierson et al. |
| 7,319,987 B1 | 1/2008 | Hoffman et al. |
| 7,327,280 B2 | 2/2008 | Bachelder et al. |
| 7,337,147 B2 | 2/2008 | Chen et al. |
| 7,343,297 B2 | 3/2008 | Bergler et al. |
| 7,463,945 B2 | 12/2008 | Kiesel et al. |
| 7,523,860 B2 | 4/2009 | Bonalle et al. |
| 7,590,852 B2 | 9/2009 | Hatter et al. |
| 7,653,899 B1 | 1/2010 | Lindahl et al. |
| 7,739,402 B2 | 6/2010 | Roese |
| 8,190,475 B1 | 5/2012 | Merrill |
| 8,255,948 B1 | 8/2012 | Black et al. |
| 8,635,087 B1 | 1/2014 | Igoe et al. |
| 2001/0034712 A1 | 10/2001 | Colvin |
| 2001/0044782 A1 | 11/2001 | Hughes et al. |
| 2002/0019814 A1 | 2/2002 | Ganesan |
| 2002/0082997 A1 | 6/2002 | Kobata et al. |
| 2002/0161718 A1 | 10/2002 | Coley et al. |
| 2003/0065918 A1 | 4/2003 | Willey |
| 2003/0163483 A1 | 8/2003 | Zingher et al. |
| 2003/0172035 A1 | 9/2003 | Cronce et al. |
| 2004/0024860 A1 | 2/2004 | Sato et al. |
| 2004/0030912 A1 | 2/2004 | Merkle et al. |
| 2004/0059929 A1 | 3/2004 | Rodgers et al. |
| 2004/0062084 A1* | 4/2004 | Layman et al. ......... 365/189.01 |
| 2004/0143746 A1 | 7/2004 | Ligeti et al. |
| 2004/0177354 A1* | 9/2004 | Gunyakti et al. ............. 717/174 |
| 2004/0187018 A1 | 9/2004 | Owen et al. |
| 2005/0010780 A1 | 1/2005 | Kane et al. |
| 2005/0055269 A1 | 3/2005 | Roetter et al. |
| 2005/0097204 A1 | 5/2005 | Horowitz et al. |
| 2005/0108173 A1 | 5/2005 | Stefik et al. |
| 2005/0138155 A1 | 6/2005 | Lewis |
| 2005/0172280 A1 | 8/2005 | Ziegler et al. |
| 2005/0187890 A1 | 8/2005 | Sullivan |
| 2005/0278542 A1* | 12/2005 | Pierson et al. ................. 713/182 |
| 2006/0005237 A1* | 1/2006 | Kobata et al. .................... 726/12 |
| 2006/0072444 A1 | 4/2006 | Engel et al. |
| 2006/0095454 A1 | 5/2006 | Shankar et al. |
| 2006/0123101 A1 | 6/2006 | Buccella et al. |
| 2006/0161914 A1 | 7/2006 | Morrison et al. |
| 2006/0200672 A1* | 9/2006 | Calhoon et al. ............... 713/176 |
| 2006/0265337 A1 | 11/2006 | Wesinger, Jr. |
| 2006/0274753 A1* | 12/2006 | Park et al. ...................... 370/392 |
| 2006/0282511 A1 | 12/2006 | Takano et al. |
| 2006/0282660 A1 | 12/2006 | Varghese et al. |
| 2007/0050638 A1 | 3/2007 | Rasti |
| 2007/0113090 A1 | 5/2007 | Villela |
| 2007/0168288 A1 | 7/2007 | Bozeman |
| 2007/0198422 A1 | 8/2007 | Prahlad et al. |
| 2007/0203846 A1 | 8/2007 | Kavuri et al. |
| 2007/0219917 A1 | 9/2007 | Liu et al. |
| 2007/0234409 A1 | 10/2007 | Eisen |
| 2007/0239606 A1 | 10/2007 | Eisen |
| 2007/0260520 A1 | 11/2007 | Jha et al. |
| 2007/0282615 A1 | 12/2007 | Hamilton et al. |
| 2007/0294403 A1 | 12/2007 | Verona |
| 2008/0010143 A1 | 1/2008 | Kniaz et al. |
| 2008/0027858 A1 | 1/2008 | Benson |
| 2008/0028455 A1 | 1/2008 | Hatter et al. |
| 2008/0040802 A1 | 2/2008 | Pierson et al. |
| 2008/0044027 A1* | 2/2008 | Van Dijk ....................... 380/278 |
| 2008/0065552 A1 | 3/2008 | Elazar et al. |
| 2008/0086423 A1 | 4/2008 | Waites |
| 2008/0092058 A1 | 4/2008 | Afergan et al. |
| 2008/0109491 A1 | 5/2008 | Gupta |
| 2008/0120195 A1 | 5/2008 | Shakkarwar |
| 2008/0147556 A1 | 6/2008 | Smith et al. |
| 2008/0212846 A1 | 9/2008 | Yamamoto et al. |
| 2008/0228578 A1 | 9/2008 | Mashinsky |
| 2008/0235375 A1 | 9/2008 | Reynolds et al. |
| 2008/0242279 A1 | 10/2008 | Ramer et al. |
| 2008/0242405 A1* | 10/2008 | Chen et al. ....................... 463/29 |
| 2008/0320607 A1 | 12/2008 | Richardson |
| 2009/0083730 A1 | 3/2009 | Richardson |
| 2009/0083833 A1* | 3/2009 | Ziola et al. ...................... 726/2 |
| 2009/0089869 A1 | 4/2009 | Varghese |
| 2009/0138975 A1 | 5/2009 | Richardson |
| 2009/0150330 A1 | 6/2009 | Gobeyn |
| 2009/0150674 A1 | 6/2009 | Richardson et al. |
| 2009/0254476 A1 | 10/2009 | Sharma et al. |
| 2009/0292743 A1 | 11/2009 | Bigus et al. |
| 2009/0320096 A1 | 12/2009 | Nolan et al. |
| 2010/0125911 A1 | 5/2010 | Bhaskaran |
| 2010/0185871 A1 | 7/2010 | Scherrer et al. |
| 2010/0235241 A1 | 9/2010 | Wang et al. |
| 2010/0305989 A1 | 12/2010 | Mu et al. |
| 2011/0040825 A1 | 2/2011 | Ramzan et al. |
| 2011/0302003 A1 | 12/2011 | Shirish et al. |
| 2012/0030771 A1 | 2/2012 | Pierson et al. |

FOREIGN PATENT DOCUMENTS

| | | |
|---|---|---|
| EP | 1 637 961 | 3/2006 |
| EP | 1637958 A2 | 3/2006 |
| EP | 1 670 188 | 6/2006 |
| WO | 9220022 | 11/1992 |
| WO | 9301550 | 1/1993 |
| WO | 9535533 | 12/1995 |
| WO | 0067095 | 11/2000 |
| WO | 2005104686 | 11/2005 |
| WO | 2007060516 | 5/2007 |
| WO | 2008/013504 A1 | 1/2008 |
| WO | WO 2008/013504 | 1/2008 |
| WO | 2008157639 | 12/2008 |
| WO | 2009039504 | 3/2009 |
| WO | 2009065135 | 5/2009 |
| WO | 2009076232 | 6/2009 |
| WO | 2009105702 | 8/2009 |
| WO | 2009143115 | 11/2009 |

(56) References Cited

FOREIGN PATENT DOCUMENTS

| WO | 2009158525 | 12/2009 |
|---|---|---|
| WO | WO 2010/104928 | 9/2010 |

OTHER PUBLICATIONS

T. S. Heydt-Benjamin, "Ultra-low-cost true randomness and physical fingerprinting," Cryptocracy, Sep. 10, 2007, Retrieved on Jul. 23, 2012, Online: http://tshb.livejournal.com/2989.html.*

Iovation, "Using Reputation of Devices to Detect and Prevent Online Retail Fraud," Iovation Reputation Services, White Paper, Apr. 2007, Online: http://www.imrg.org/ImrgWebsite/IMRGContents/Files/wp_iovation_fraud_120508.pdf.*

Iovation, "Controlling High Fraud risk of International Transactions," Iovation Reputation Services, White Paper, May 2007, Online: http://www.imrg.org/ImrgWebsite/IMRGContents/Files/wp_iovation_fraud_130508.pdf.*

The Linux Information Project, "Hidden File Definition," Updated on Jul. 21, 2006, Wayback Machine (Oct. 17, 2007), Retrieved on Jul. 19, 2002, Online: http://web.archive.org/web/20071017224738/http://bellevuelinux.org/hidden_file.html.*

Pappu Srinivasa Ravikanth, "Physical One-Way Functions," PhD thesis, Massachusetts Institute of Technology, 2001. See pp. 15-20.*

B. Gassend, et al. "Silicon Physical Random Functions," CCS'02, Nov. 18-22, 2002, Washington DC, pp. 148-160.*

Guarjardo Merchan, et al. "Identification of devices using physically unclonable functions," WO 2009/024913 A2, Published Feb. 26, 2009.*

P. Ravikanth, Physical One-Way Functions, Mar. 2001, PhD Thesis at the Massachusetts Institute of Technology, 154 pages.*

D. Clarke, et al. "Secure Hardware Processors using Silicon Physical One-Way Functions," MIT Laboratory fo Computer Science, Mar. 2002.*

Wikipedia: "Software Extension," May 28, 2009, Internet Article retrieved on Oct. 11, 2010. XP002604710.

Angha et al.; Securing Transportation Network Infrastructure with Patented Technology of Device Locking—Developed by Uniloc USA; http://www.dksassociates.com/admin/paperfile/ITS%20World%20Paper%20Submission_Uniloc%20_2_.pdf; Oct. 24, 2006.

Econolite; Econolite and Uniloc Partner to Bring Unmatched Infrastructure Security to Advanced Traffic Control Networks with Launch of StrongPoint; http://www.econolite.com/docs/press/20080304_Econolite_StrongPoint.pdf; Mar. 4, 2008.

International Search Report and Written Opinion mailed on Aug. 10, 2010, for PCT Application No. PCT/US2010/023739.

David J-L, "Cookieless Data Persistence in Possible," Apr. 23, 2003, Internet Article retrieved on Sep. 21, 2010.

Smolens et al., "Detecting Emerging Wearout Faults," *In Proceedings of the IEEE Workshop on Silicon Errors in Logic—System Effects*, Apr. 2007, Internet Article retrieved on Sep. 30, 2010. XP002603491.

Williams et al., "Web Database Applications with PHP & MySQL," *O'Reilly Media Chapter 1. Database Applications and the Web*, Mar. 2002, Internet Article retrieved on Sep. 21, 2010. XP002603488.

"How it Works?" Article downloaded from www.mint.com on Mar. 31, 2011 with a publication date of Sep. 14, 2007, 6 pages.

Kurchak, Kent, "Notes Application Strategies: User Activity Tracking," Mar. 14, 2004, 14 pages.

Williams, "A Painless Guide to CRC Error Detection Algorithms," 33 pages, www.ross.net/crc/download/crc_v3.txt, Version 3, Aug. 19, 1993.

Gupta et al., "Efficient Fingerprint-based User Authentication for Embedded Systems," *Proceedings of the 42nd Annual Design Automation Conference*, New York City, New York, 2005.

"German Stores Put Money at Your Fingertips", *Independent Online*, Sep. 4, 2007.

"Lowes Foods Brings Biometric Payments and Check Cashing to Its Customers," Banking & Financial Solutions, Bioguard Components & Technologies Ltd, Feb. 7, 2005.

"Pay by Touch," From Wikipedia, Feb. 22, 2011, 2 pages.

Agbinya et al., "Development of Digital Environment Identity (DEITY) System for On-line Access," Third International Conference on Broadband Communications, Information Technology & Biomedical Applications, Third International Conference on IEEE, Piscataway, New Jersey, Nov. 23, 2008, 8 pages. XP031368250.

Sim et al. "Continous Verification Using Multimodal Biometrics", *IEEE Transactions on Pattern Analysis and Machine Intelligence*, vol. 29, No. 4, Apr. 1, 2007, IEEE Serivce Center, Los Alamitos, CA, pp. 687-700. XP011168507.

Lee et al., "Analogous Content Selection Mechanism Using Device Profile and Content Profile for U-Learning Environments," 2009 Ninth IEEE International Conference on Advanced Learning Technologies, IEEE Computer Society.

Fraga, David, "Information Technology, Regime Stability and Democratic Meaningfulness: A Normative Evaluation of Present and Potential Trends," Honor's Thesis for a Degree for College Undergraduate Research, University of Pennsylvania, Mar. 30, 2007, 73 pages.

Soto, Lucy, "Not-so-Private Web: Information Leaks on Social Networks Can Leave Users Vulnerable," *The Atlanta Journal-Constitution*, Feb. 14, 2010, 3 pages.

Johnson et al. "Dimensions of Online Behavior: Toward a User Typology," *Cyberpsycology and Behavior*, vol. 10, No. 6, pp. 773-779, 2007. XP002617349.

Lemos, Robert, "Fingerprint Payments Taking Off Despite Security Concerns," *Security Focus*, Oct. 10, 2007, 3 pages.

Transcript from CBS Corp New, UBS Global Media Conference on Dec. 3, 2007 with Dave Poltrack by Matt Coppett, 9 pages.

Clarke et al. "Secure Hardware Processors Using Silicon One-Way Functions," MIT Laboratory for Computer Science, Mar. 2002, p. 141.

Lazanu et al., Modelling spatial distribution of defects and estimation of electrical degradation of silicon detectors in radiation fields at high luminosity, Oct. 10, 2006, 5 pages.

* cited by examiner

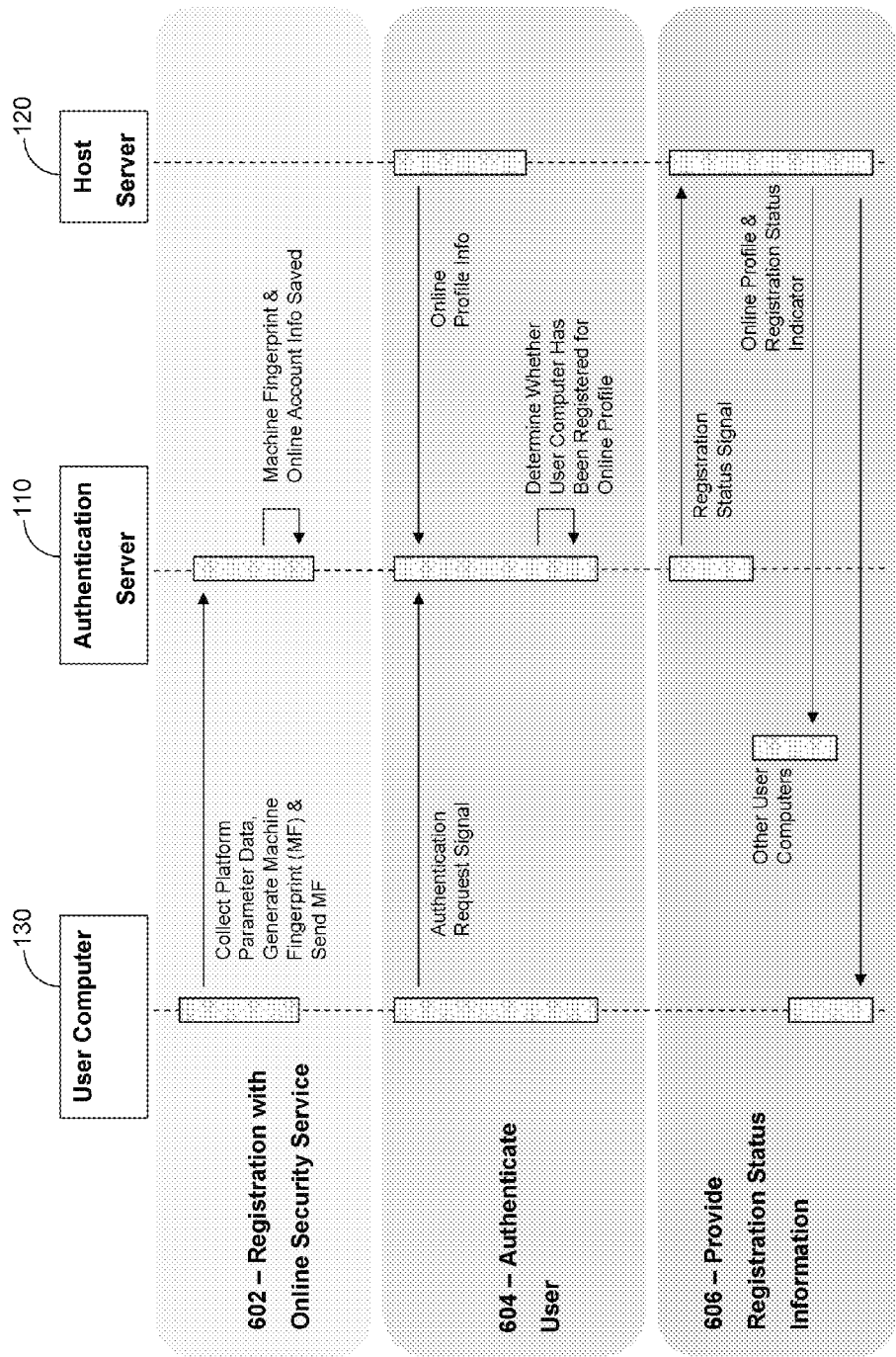

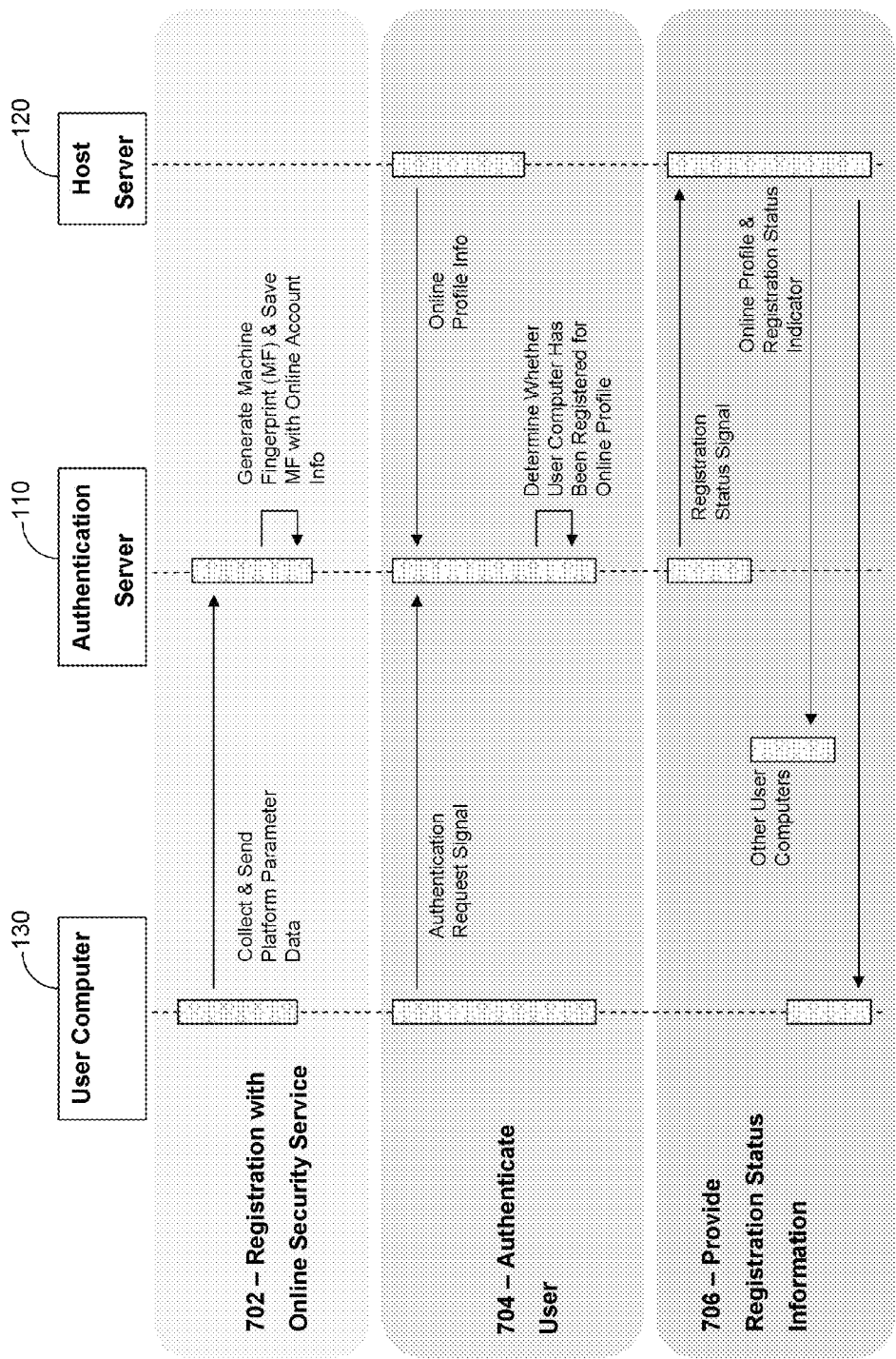

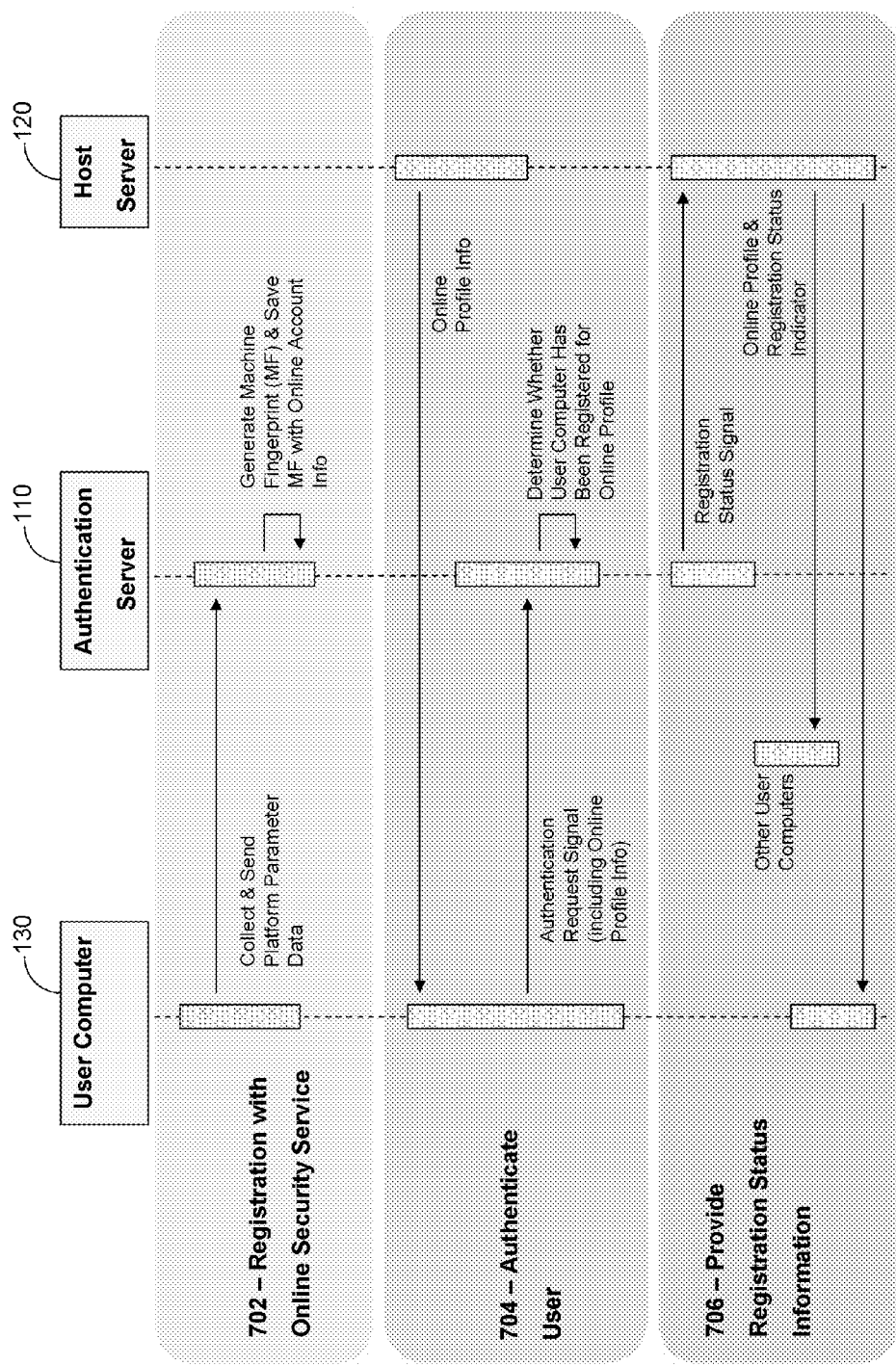

WEB CONTENT ACCESS USING A CLIENT DEVICE IDENTIFIER

CROSS-REFERENCE TO RELATED APPLICATIONS

This patent application claims benefit of U.S. Provisional Patent Application No. 61/151,449, filed Feb. 10, 2009, which is specifically incorporated by reference herein in its entirety.

BACKGROUND

1. Field of the Invention

The present invention is directed toward systems for authenticating online service users, and more particularly, to a system that interfaces with the each user's network device to measure the client system's hardware configuration and thereby generate a device identifier that can be used to authenticate the user.

2. Description of the Related Art

Currently, there are limited ways to authenticate online users of services and content, such as social networking sites, auction sites, shopping sites, etc. One known approach has been to require a credit card to create an account or authenticate an account user. The hope is that the collection of personally identifiable information, such as credit card data, driver's licenses, etc. will keep online users accountable for their actions. However, such approaches may be inconvenient for all users, including legitimate ones who do not have a credit card or do not wish to provide personal information, and thereby may drive potential legitimate users away.

Accordingly, it would be very desirable to provide an authentication service that provides reliable identification of users, without being unduly burdensome for online service users. Such a service may be used alone, or in conjunction with other security/authentication measures.

SUMMARY OF THE INVENTION

In accordance with one aspect of the embodiments described herein, there is provided a method for authenticating a user of an online service, comprising: retrieving data regarding an online profile of the user for the online service; and collecting machine information regarding a network device (e.g., a computer) being used by the user to access the online service, the step of collecting machine information comprising checking at least one of hard disk volume name, hard disk initialization date, processor type, and/or software serial number. The step of collecting machine information may further comprise checking the IP address of the network device. The method may further comprise generating a device identifier based at least in part on the collected machine information. The generated device identifier may be stored in a hidden file directory of the computer. The method may further comprise transmitting the generated device identifier and the retrieved online profile data to an authentication server.

In accordance with another aspect of the embodiments described herein, there is provided an applet comprising executable code for a Java Virtual Machine (JVM) to: retrieve data regarding an online profile of the user for the online service; and collect machine information regarding a computer being used by the user to access the online service, the step of collecting machine information comprising checking at least one of hard disk volume name, hard disk initialization date, processor type, and/or software serial number. The step of collecting machine information may further comprise checking the IP address of the computer. The applet may further comprise executable code for the JVM to generate a device identifier based at least in part on the collected machine information. The generated device identifier may be stored in a hidden file directory of the computer. The applet may further comprise executable code for the JVM to transmit the generated device identifier and the retrieved online profile data to an authentication server.

In accordance with another aspect of the embodiments described herein, there is provided a method for authenticating a user of an online service, comprising: receiving a first device identifier from a computer being used by the user, the first device identifier being generated from machine information regarding at least one of hard disk volume name, hard disk initialization date, processor type, and/or software serial number. The first device identifier may be based at least in part on the IP address of the computer. The method may further comprise receiving online profile information of the user for the online service, and associating the first device identifier with the received online profile information. The method may further comprise receiving an authentication request signal from the user, the request signal comprising a second device identifier. When the second device identifier matches the first device identifier, a registered user signal may be transmitted to a server hosting the online service, the registered user signal comprising instructions for the server to include a registered status indicator in the user's online profile information.

In accordance with another aspect of the embodiments described herein, there is provided a system for authenticating a user of an online service on a computer network, comprising a server connected to the computer network. The server may be adapted to provide the functions of: receive a first device identifier from a computer being used by the user, the first device identifier being generated from machine information regarding at least one of hard disk volume name, hard disk initialization date, processor type, and/or software serial number. The first device identifier may be generated at least in part on the IP address of the computer. The system may be further adapted to provide the functions of: receive online profile information of the user for the online service; associate the first device identifier with the received online profile information; and receive an authentication request signal from the user, the request signal comprising a second device identifier. When the second device identifier matches the first device identifier, a registered user signal may be transmitted to a server hosting the online service, the registered user signal comprising instructions for the server to include a registered status indicator in the user's online profile information.

In accordance with another aspect of the embodiments described herein, there is provided a method for controlling access to web content or web site services, comprising: for a user using a machine to attempt to access the web content, providing an opportunity to create a device identifier. When the user opts to create the device identifier, the method may comprise gathering information regarding platform parameters of the machine and generating a unique device identifier based at least in part on the platform parameters. The generated device identifier may be stored on the machine as a key file and/or at a remote site as a remote key file. When the user attempts to access the web content, the method may further comprise: comparing the key file on the user's machine with the remote key file; and allowing access to the web content if the key file on the user's machine matches the remote key file.

In accordance with another aspect of the embodiments described herein, there is provided a method for verifying online identity, comprising: for a user using a machine to attempt to access a social networking site, providing an opportunity to create a device identifier. When the user opts to create the device identifier, the method may further comprise gathering information regarding platform parameters of the machine and generating a unique device identifier based at least in part on the platform parameters. The generated device identifier may be stored on the machine as a key file and/or at a remote site as a remote key file. When the user accesses the social networking site, the method may further comprise: comparing the key file on the user's machine with the remote key file; and allowing access to the social networking site when the key file on the user's machine matches the remote key file.

The foregoing methods and steps thereof may be encoded as executable instructions in a computer-readable media, such as, for example, in a hard drive or in a portable media, such as an optical disk, electronic memory device, or magnetic tape, disk, or the like.

BRIEF DESCRIPTION OF THE DRAWINGS

FIG. 6A provides a sequence diagram for an exemplary system for authenticating online service users, wherein the device identifier is generated by an applet on the user's computer.

FIG. 7A provides a sequence diagram for an exemplary system for authenticating online service users, wherein the device identifier is generated at an authentication server.

FIG. 7B provides a sequence diagram for another exemplary system for authenticating online service users, wherein the device identifier is generated at an authentication server.

DETAILED DESCRIPTION OF THE PREFERRED EMBODIMENT

The present technology provides for an improved system and method of identifying or tracking online service users. Specifically, the present technology utilizes measurable hardware characteristics of a local client that any online user of any age has in front of them when accessing the Internet, such as their connected computer or computing device for identification and user tracking. The present technology allows users to register their computer(s) or other client hardware and associate the registered computers with one or more online accounts, such as accounts for social networking, online auctioning or shopping accounts, etc.

For example, in the context of social networking sites, such as MySpace®, Facebook®, Orkut®, Friendster®, or Xanga®, the present technology gives parents and social networking site administrators the power to protect their children from online threats. It does this by letting online users take the extra security step of linking their accounts to the actual computers or other client hardware they use, giving their online friends a higher level of trust that they are who they say they are, and not an online fraudster or predator.

Figure 1:
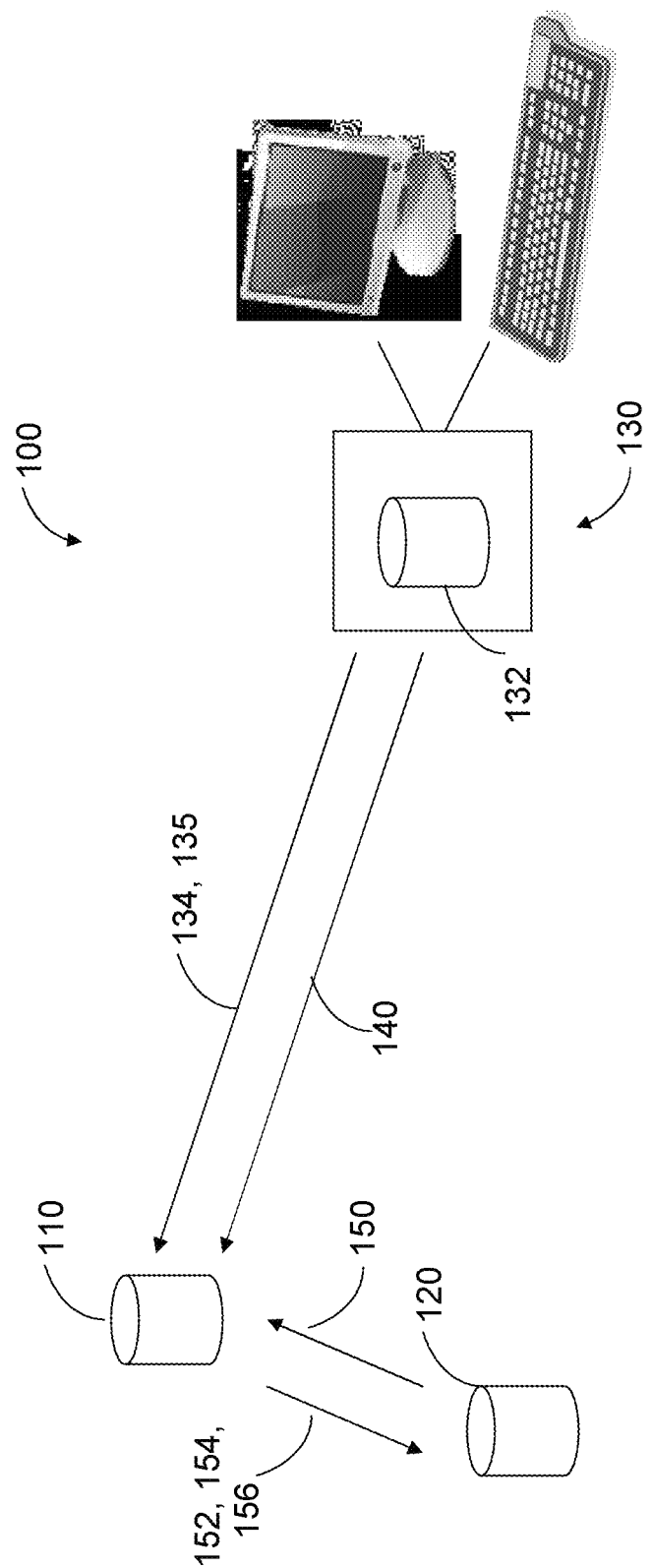
FIG. 1 provides a block diagram of an exemplary system for authenticating online service users.

In accordance with one aspect of the present technology, there is provided a system and method for authenticating the identity of web site users by utilizing one or more parameters of the users' respective client hardware. In one embodiment, shown in FIG. 1, there is provided a system 100 with an authentication server 110 that is in operative communication with numerous other servers, such as server 120, as well as user computers, such as exemplary user computer 130. The user computer 130 comprises a web browser along with an application or an applet 132 that that can run within the web browser.

For example, suppose server 120 hosts a social networking site. The authentication server 110 along with an applet 132 running on the user computer 130 may give parents and social networking sites the tools for protecting children from online threats. The system 100 may operate to link users' online accounts to the actual computers or machines they use to access the networking website.

The applet 132 may include a registration routine that collects information regarding the user's computer 130 by checking a number of parameters which are expected to be unique to the user machine environment. The parameters checked may include, for example, hard disk volume name, user name, computer name, user password, hard disk initialization date, etc. The collected information may include information that identifies the hardware comprising the platform on which the web browser runs, such as, for example, CPU number (where available), or unique parameters associated with the firmware in use. The system information may further include system configuration information, such as amount of memory, type of processor, software or operating system serial number, etc.

Figure 2:
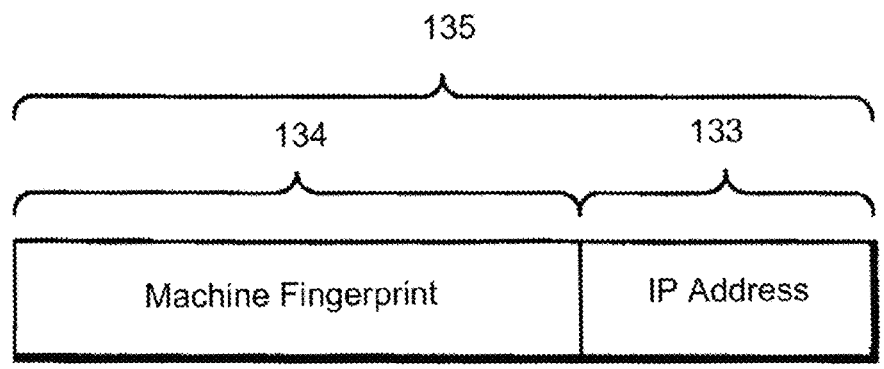
FIG. 2 provides a block diagram of an exemplary machine signature comprising a device identifier and an IP address.

Based on the collected information, the applet 132 may generate a device identifier, such as a machine fingerprint 134, that is unique for the user computer 130. In the alternative, or in addition, the applet 132 may gather and send the system parameters to the authentication server 110, which in turn generates the machine fingerprint 134. The machine fingerprint 134 may be stored in a hidden directory of the computer 130 and/or at a remote location, such as the authentication server 110, as explained below. The machine fingerprint 134 may incorporate the computer's IP address to add another layer of specificity to machine's signature. In the alternative, or in addition, the machine fingerprint 134 may be combined with the IP address 133 of the computer 130 to generate a machine signature 135 for the computer 130, as shown in FIG. 2.

It is noted that an application (e.g., applet 132) running on the network device (e.g., computer 130) or otherwise having access to the network device's hardware and file system may generate a unique device identifier (e.g., machine fingerprint 134) using a process that operates on data indicative of the network device's configuration and hardware. The device identifier may be generated using a combination of user-configurable and non-user-configurable machine parameters as input to a process that results in the device identifier, which may be expressed in digital data as a binary number. Each machine parameter is data determined by a hardware component, software component, or data component specific to the device that the unique identifier pertains to. Machine parameters may be selected based on the target device system configuration such that the resulting device identifier has a very high probability (e.g., greater than 99.999%) of being unique to the target device. In addition, the machine parameters may be selected such that the device identifier includes at least a stable unique portion up to and including the entire identifier, that has a very high probability of remaining unchanged during normal operation of the target device. Thus, the resulting device identifier should be highly specific, unique, reproducible and stable as a result of properly selecting the machine parameters.

The application for generating the device identifier may also operate on the collected parameters with one or more algorithms to generate the device identifier. This process may include at least one irreversible transformation, such as, for example, a cryptographic hash function, such that the input machine parameters cannot be derived from the resulting device identifier. Each identifier, to a very high degree of certainty, cannot be generated except by the suitably configured application operating on or otherwise having had access to the same network device for which the device identifier was first generated. Conversely, each identifier, again to a very high degree of certainty, can be successfully reproduced by the suitably configured application operating or otherwise having access to the same network device on which the identifier was first generated.

The application may operate by performing a system scan to determine a present configuration of the field security device. The application may then select the machine parameters to be used as input for generating the unique device identifier. Selection of parameters may vary depending on the system configuration. Once the parameters are selected, the application may generate the identifier.

Further, generating the device identifier may also be described as generating a device fingerprint and may entail the sampling of physical, non-user configurable properties as well as a variety of additional parameters such as uniquely generated hashes and time sensitive values. Physical device parameters available for sampling may include, for example, unique manufacturer characteristics, carbon and silicone degradation and small device failures.

The process of measuring carbon and silicone degradation may be accomplished by measuring a chip's ability to process complex mathematical computations, and its ability to respond to intensive time variable computations. These processes measure how fast electricity travels through the carbon. Using variable offsets to compensate for factors such as heat and additional stresses placed on a chip during the sampling process allows for each and every benchmark to reproduce the expected values. During a standard operating lifetime, the process of passing electricity through the various switches causes a computer chip to degrade. These degradations manifest as gradually slower speeds that extend the processing time required to compute various benchmarking algorithms.

In addition to the chip benchmarking and degradation measurements, the process for generating a device identifier may include measuring physical, non-user-configurable characteristics of disk drives and solid state memory devices. Each data storage device has a large variety of damage and unusable data sectors that are nearly unique to each physical unit. The ability to measure and compare values for damaged sectors and data storage failures provides a method for identifying storage devices.

Device parameter sampling, damage measurement and chip benchmarking make up just a part of device fingerprinting technologies described herein. These tools may be further extended by the use of complex encryption algorithms to convolute the device identifier values during transmission and comparisons. Such encryption processes may be used in conjunction with random sampling and key generations.

The device identifier may be generated by utilizing machine parameters associated with one or more of the following: machine model; machine serial number; machine copyright; machine ROM version; machine bus speed; machine details; machine manufacturer; machine ROM release date; machine ROM size; machine UUID; and machine service tag.

The device identifier may also be generated by utilizing machine parameters associated with one or more of the following: CPU ID; CPU model; CPU details; CPU actual speed; CPU family; CPU manufacturer; CPU voltage; and CPU external clock.

The device identifier may also be generated by utilizing machine parameters associated with one or more of the following: memory model; memory slots; memory total; and memory details.

The device identifier may also be generated by utilizing machine parameters associated with one or more of the following: video model; video details; display model; display details; audio model; and audio details.

The device identifier may also be generated by utilizing machine parameters associated with one or more of the following: network model; network address; Bluetooth address; BlackBox model; BlackBox serial; BlackBox details; BlackBox damage map; BlackBox volume name; NetStore details; and NetStore volume name.

The device identifier may also be generated by utilizing machine parameters associated with one or more of the following: optical model; optical serial; optical details; keyboard model; keyboard details; mouse model; mouse details; printer details; and scanner details.

The device identifier may also be generated by utilizing machine parameters associated with one or more of the following: baseboard manufacturer; baseboard product name; baseboard version; baseboard serial number; and baseboard asset tag.

The device identifier may also be generated by utilizing machine parameters associated with one or more of the following: chassis manufacturer; chassis type; chassis version; and chassis serial number.

The device identifier may also be generated by utilizing machine parameters associated with one or more of the following: IDE controller; SATA controller; RAID controller; and SCSI controller.

The device identifier may also be generated by utilizing machine parameters associated with one or more of the following: port connector designator; port connector type; port connector port type; and system slot type.

The device identifier may also be generated by utilizing machine parameters associated with one or more of the following: cache level; cache size; cache max size; cache SRAM type; and cache error correction type.

The device identifier may also be generated by utilizing machine parameters associated with one or more of the following: fan; PCMCIA; modem; portable battery; tape drive; USB controller; and USB hub.

The device identifier may also be generated by utilizing machine parameters associated with one or more of the following: device model; device model IMEI; device model IMSI; and device model LCD.

The device identifier may also be generated by utilizing machine parameters associated with one or more of the following: wireless 802.11; webcam; game controller; silicone serial; and PCI controller.

In one example, the device identifier may also be generated by utilizing machine parameters associated with one or more of the following: machine model, processor model, processor details, processor speed, memory model, memory total, network model of each Ethernet interface, network MAC address of each Ethernet interface, BlackBox Model, BlackBox Serial (e.g., using Dallas Silicone Serial DS-2401 chipset or the like), OS install date, nonce value, and nonce time of day.

Figure 3:
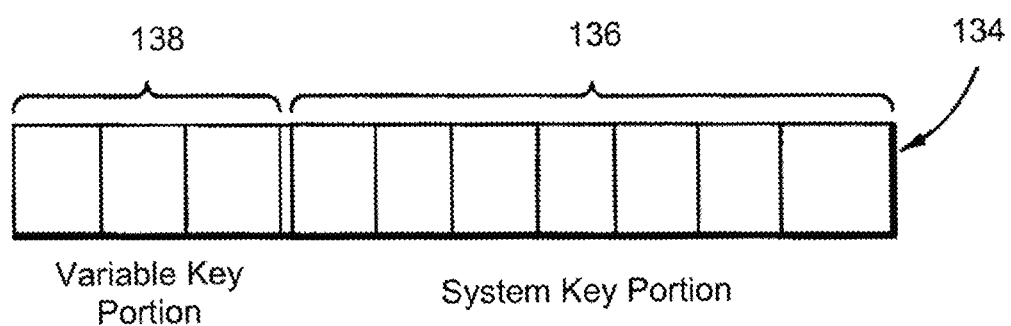
FIG. 3 provides a block diagram of an exemplary device identifier comprising a variable key portion and a system key portion.

With reference to FIG. 3, in one embodiment, the device identifier (e.g., the machine fingerprint 134) may include two components—namely, a system key portion 136 and a variable key portion 138. The variable key portion 138 may be generated at the time of registration of computer 130 by reference to a variable platform parameter, such as via reference to system time information, although other parameters which are variable may be utilized in other embodiments. The system key portion 136 may include the above described parameters expected to be unique to the user machine 130, such as, for example, hard disk volume name, user name, computer name, user password, hard disk initialization date, etc. Portions 136 and/or 138 may be combined with the IP address 133 of the computer 130 and/or other platform parameters to generate a machine signature 135.

The applet 132 may prompt the user to register with an online security service, and may electronically send the machine fingerprint 134 and/or machine signature 135 and information regarding his/her online account(s) to the authentication server 110, such as by using a secured network connection. The authentication server 110 may encrypt and store all such received data regarding machine fingerprints 134 and online accounts.

When the registered user then uses the computer 130 to access a social networking site running on server 120, the applet 132 may detect that the machine fingerprint 134 has been created and transmitted to the authentication server 110. The applet may detect that one or more online networking accounts are associated with the machine fingerprint 134 and have been registered for the user at the authentication server 110.

Then, in response to the computer 130 accessing the server 120, the applet 132 may transmit an authentication request signal 140 to the authentication server 110. The authentication request signal 140 may include the machine fingerprint 134 and/or machine signature and online account profile information. Server 110 may further receive user identification (ID) or other basic online account profile information 150 from server 120. By comparing the received profile information 150 from server 120 with the authentication request signal 140 from the computer 130, the authentication server 120 may determine whether the computer 130 has been registered for a given online account. In the alternative, or in addition, the applet 132 may transmit an authentication request signal 140 to the server 120, which in turn may communicate with the authentication server 110 to determine whether the user of computer 130 has registered with the online security service.

If the authentication server 110 verifies, based on the registered machine fingerprint 134 and any online networking accounts, that the computer 130 has been previously registered with the online security service for the online account that the user is trying to access, then the server 110 may send a registered user signal 152, indicating a high trust level, to server 120. If the authentication server 110 is not able to verify that the computer 130 has been previously registered with the online security service for the account that the user is trying to access, then the server 110 may send an unregistered user signal 154, indicating that the user is not registered, to server 120. In the alternative, or in addition, the server 110 may provide the user the opportunity to register the computer 130 with the online security service. If the authentication server 110 determines that the user's account has been flagged, such as, for example, when the website or online service access has been previously denied for computer 130, then the server 110 may send a problem user signal 156, indicating danger, to server 120.

Figure 4:
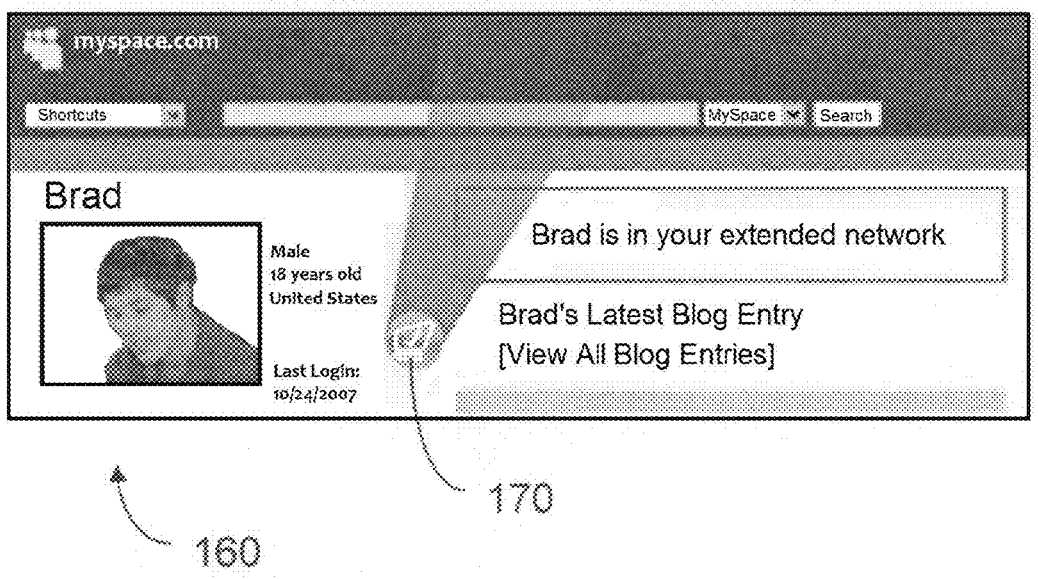
FIG. 4 illustrates an exemplary screenshot showing a display of an online profile with an exemplary registered user indicator.
Figure 5:
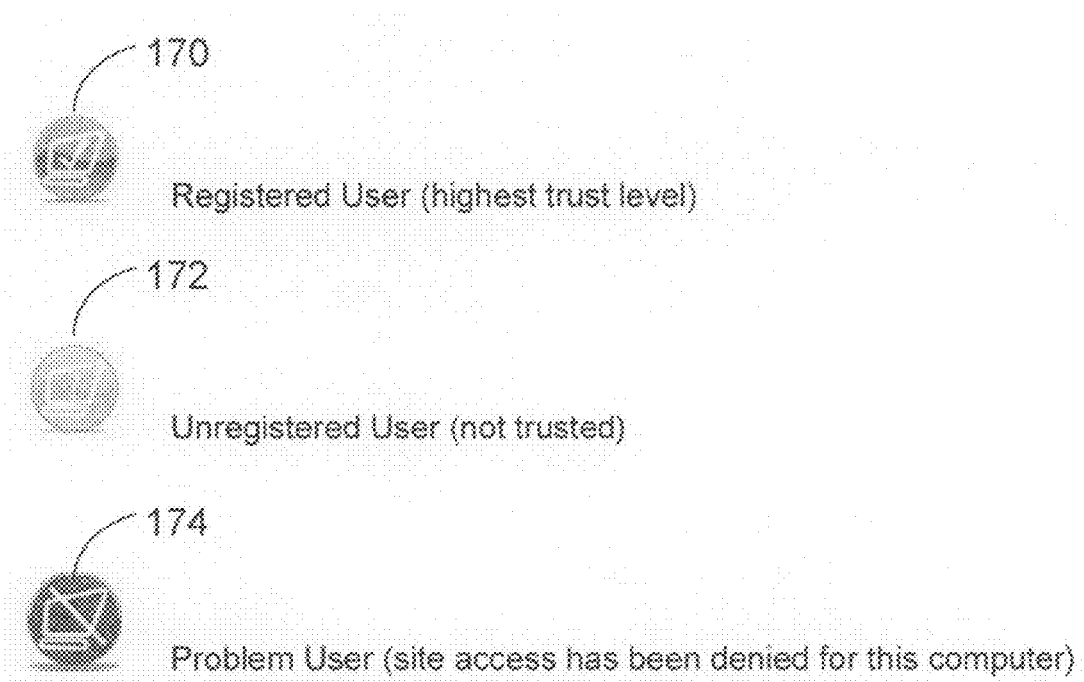
FIG. 5 provides exemplary icons that may be used to indicate the registration status of online service users.

In response to the registered user signal 152, unregistered signal 154, or problem user signal 156 from the authentication server 110, server 120 may update or supplement the user's profile to indicate whether or not the user has registered with the online security service. For example, with reference to FIG. 4 the user's online profile 160 on server 120 may be updated to include a registered user indicator, such as a registered user icon 170 (e.g., a computer screen with a check mark inside it) to indicate that the user is a registered user and that there is a high level of trust with this particular user. As shown in FIG. 5, numerous types of icons with various shapes, motifs, and colors may be used to indicate whether the user is registered with the online security service. For example, an unregistered icon 172 (e.g., a computer screen with a question mark inside it) can be used to indicate that the user has not registered with the online security service. Similarly, a problem user icon 174 (e.g., a computer screen with a slash through it) may be used to indicate the user may pose a danger and should be avoided.

Online users displaying icon 170 on their online profile 160 may essentially convey to other website or online service users: "I am who I say I am because I am on my computer, and I am willing to be held accountable for my online actions." For normal and conscientious users, registration with the online security service is an easy choice. For malicious users, the creation of a computer fingerprint and registration with the online security service poses unacceptable risks.

Embodiments have been described herein in the context of online networking sites. However, it will be understood that the authentication methods and systems described herein may be applicable to any online service or site, particularly where online or user IDs are created and used. For example, the authentication technology described herein may be utilized in the context of an online auction or shopping sites, such as eBay or the like. Machine fingerprinting and user ID registration with an online security service may be used to authenticate buyers and sellers on such auction or shopping sites. Moreover, it will be understood that the technology described herein may be applicable to any situation where a computer user needs to be authenticated, and in particular where it would be desirable to authenticate that a person registering with or using an online service with a given identity is not using hardware used for malicious purposes in the past, or is using hardware consistent with the user's past behavior.

Embodiments of fingerprinting and authentication methods and systems have been described with reference to a user's computer. However, it will be understood that the fingerprinting and authentication approaches described herein are applicable to computing devices in general, including but not limited to, desktops, laptops, tablet computers, PDAs, mobile devices, mobile phones, vehicle onboard computers, and any other network device capable of communication with a computer network.

It will be understood that the described system for authenticating the identify of web site users via utilization of parameters of the users' respective client hardware, can comprise any number of components or modules adapted to perform the authentication steps as will be known of ordinary skill in the art. For example, with reference to FIG. 6A, there is provided one embodiment of a system wherein an application or applet running on the user computer 130 may collect platform parameter data regarding the computer 130 and generate a machine fingerprint (step 602). The computer 130 may send the machine fingerprint to the authentication server 110. The authentication server 110 may also receive online account information from the computer 130 and/or the host server 120. The authentication server 110 may associate the received machine fingerprint with the appropriate online account information.

With continued reference to FIG. 6A, at step 604, in response to the computer 130 accessing the server 120, an application or applet (e.g., an applet comprising executable code for a Java Virtual Machine) on the user computer 130 may send an authentication request signal to the authentication server 110. Authentication server 110 may receive a given online profile information from the host server 120, and determine whether computer 130 has been registered with the online profile information. Based on this determination at step 604, the authentication server 110 (at step 606) may send the appropriate registration status signal to the host server 120, which in turn may update the online profile information to include the user's registration status. The host server 120 may share the user's online profile information and registration status indicator (see FIGS. 4 and 5) with other user computers (i.e., anyone accessing the online service hosted by the server 120).

Figure 6B:
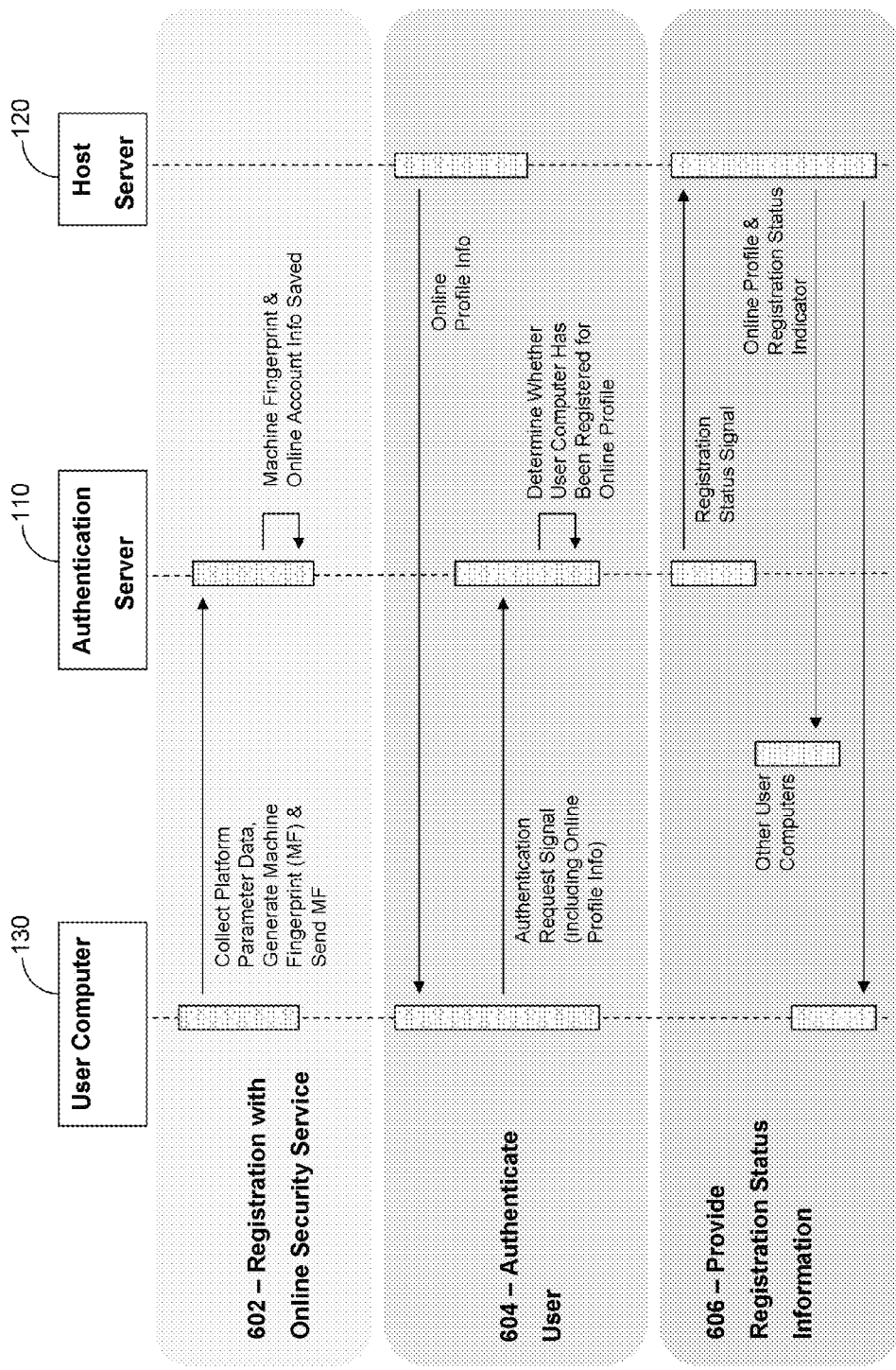
FIG. 6B provides a sequence diagram for another exemplary system for authenticating online service users, wherein the device identifier is generated by an applet on the user's computer.

With reference to FIG. 6B, there is provided another embodiment of a user authentication system. In contrast to the system of FIG. 6A, at step 604, the user computer 130 receives the user's online profile information from the host server 120, and sends the authentication request signal (including the online profile information) to the authentication server 110. The authentication request signal may include the machine fingerprint and/or machine signature and/or online profile information. The authentication server 110 may receive the components of the authentication request signal, such as the online profile information, from the host server 120 and/or the user computer 130. The rest of the system shown in FIG. 6B is similar to the system shown in FIG. 6A.

With reference to FIG. 7A, there is provided another embodiment of a user authentication system, wherein the application or applet running on the user computer 130 may collect platform parameter data regarding the computer 130 and send the collected data to the authentication server 110 (at step 702). The authentication server 110 in turn may generate the machine fingerprint regarding computer 130, and save it along with the online account information from the computer 130 and/or the host server 120. The rest of the system shown in FIG. 7A is similar to the system shown in FIG. 6A.

With reference to FIG. 7B, there is provided another embodiment of a user authentication system, wherein the application or applet running on the user computer 130 may collect platform parameter data regarding the computer 130 and send the collected data to the authentication server 110 (at step 702). As with the system of FIG. 7A, the authentication server 110 may generate the machine fingerprint regarding computer 130, and save it along with the online account information from the computer 130 and/or the host server 120 (at step 702). However, in contrast to the system of FIG. 7A, at step 704, the user computer 130 receives the user's online profile information from the host server 120, and sends the authentication request signal (including the online profile information) to the authentication server 110. The rest of the system shown in FIG. 7B is similar to the system shown in FIG. 7A.

Figure 8:
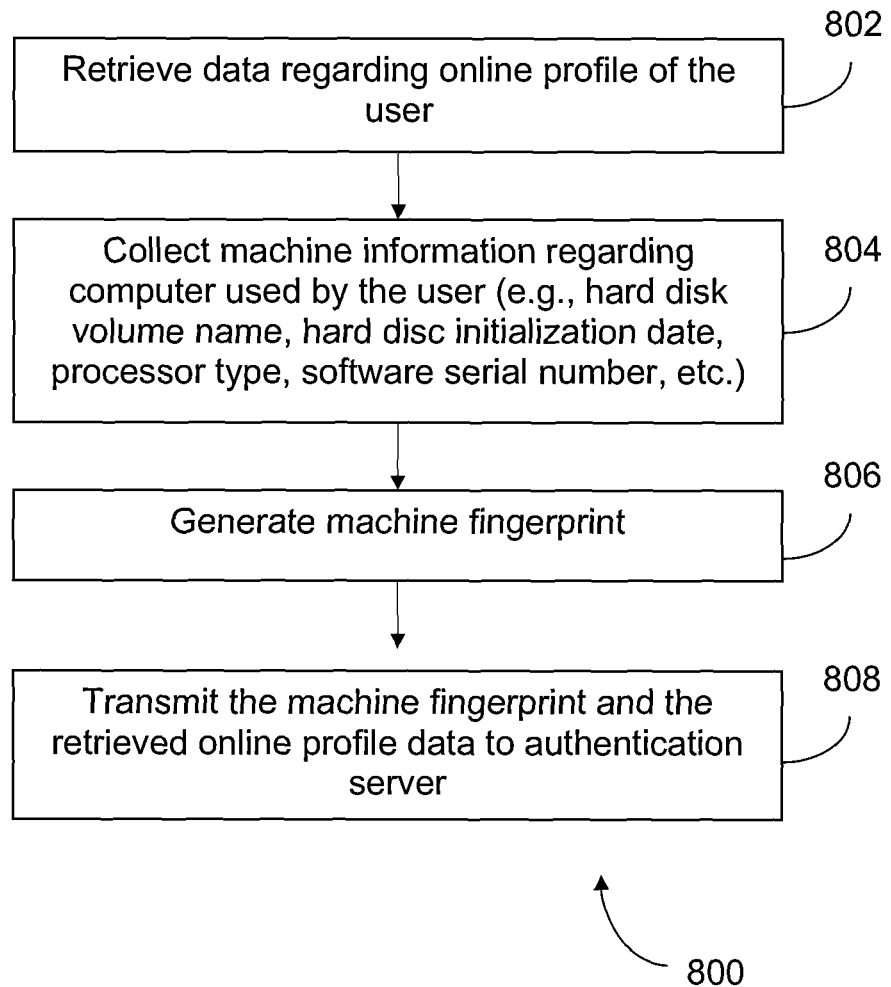
FIG. 8 is a flow chart illustrating steps of one approach to generating device identifiers for computers used by online service users.

With reference to FIG. 8, there is provided a method 800 for authenticating a user of an online service that may comprise retrieving data regarding an online profile of the user for the online service (step 802), and collecting machine information regarding a computer being used by the user to access the online service (step 804). The step of collecting machine information may include checking at least one of hard disk volume name, hard disk initialization date, processor type, and/or software serial number of the computer. The step of collecting machine information may further include checking and using the IP address of the computer. At step 806, a machine fingerprint is generated based at least in part on the collected machine information. At step 808, the generated machine fingerprint and the retrieved online profile data are transmitted to an authentication server. The generated machine fingerprint may also be stored in a hidden file directory of the computer. The foregoing steps may be encoded as executable instructions in a computer-readable media, such as, for example, in a hard drive or in a portable media, such as an optical disk, electronic memory device, or magnetic tape, disk, or the like.

Figure 9:
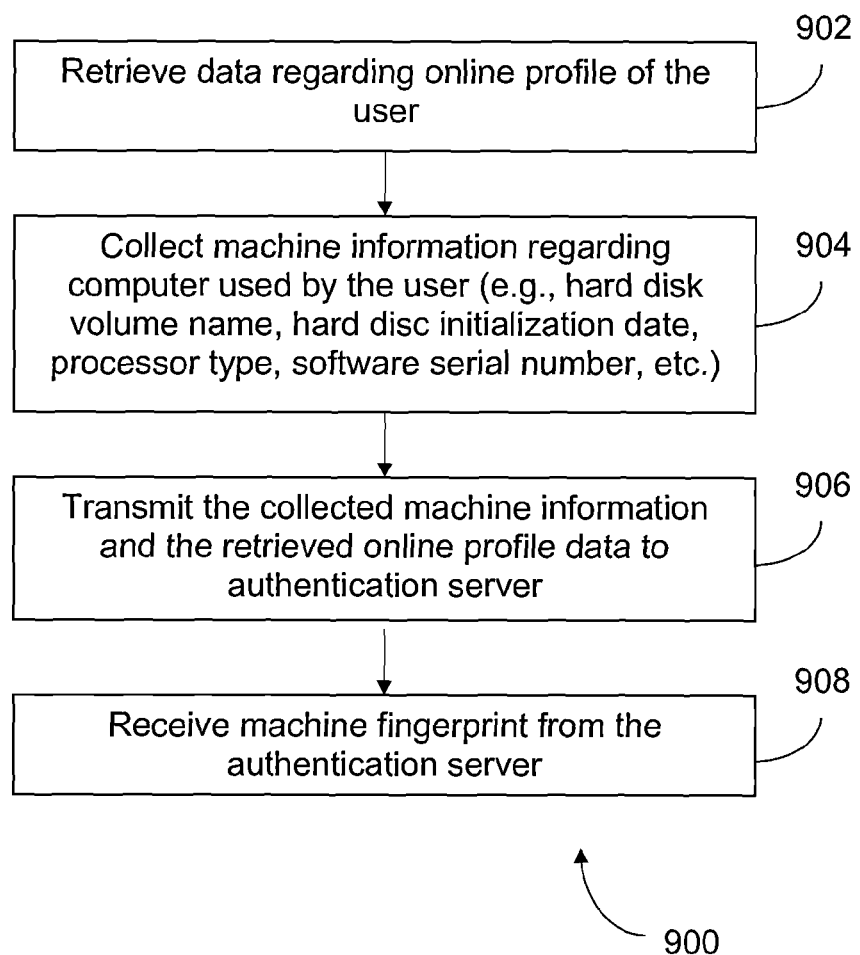
FIG. 9 is a flow chart illustrating steps of another approach to generating device identifiers for computers used by online service users.

With reference to FIG. 9, there is provided another method 900 for authenticating a user of an online service that may comprise retrieving data regarding an online profile of the user for the online service (step 902), and collecting machine information regarding a computer being used by the user to access the online service (step 904). In contrast to the method of FIG. 8, a machine fingerprint is not generated; rather, at step 906, the collected machine information and the retrieved profile data may be transmitted to the authentication server. The authentication server in turn may generate a machine fingerprint for the user computer. At step 908, the machine fingerprint may be received from the authentication server. The received machine fingerprint may also be stored in a hidden file directory of the computer. The foregoing steps may be encoded as executable instructions in a computer-readable media, such as, for example, in a hard drive or in a portable media, such as an optical disk, electronic memory device, or magnetic tape, disk, or the like.

Figure 10:
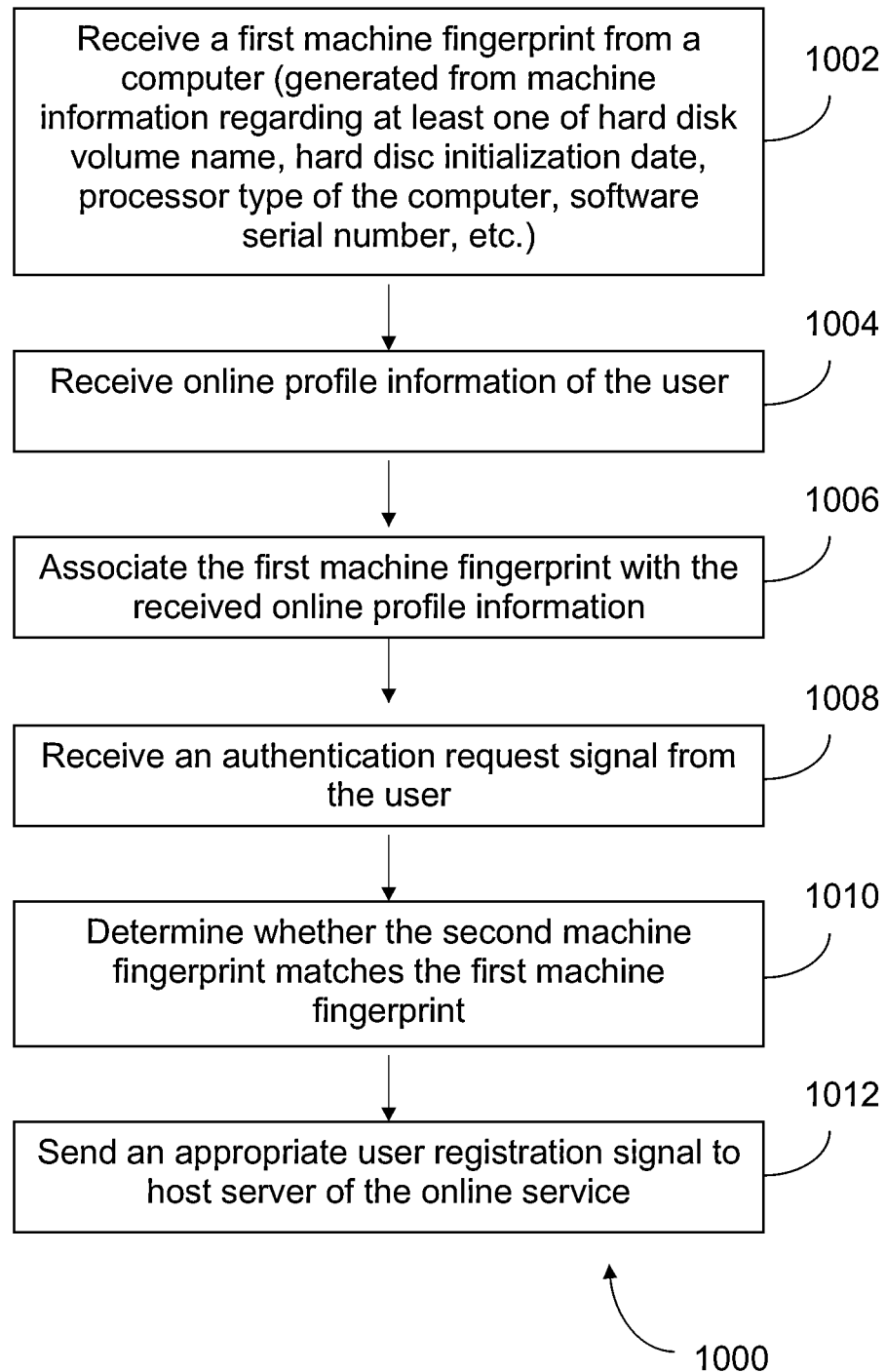
FIG. 10 is a flow chart illustrating steps of one approach to authenticating online service users.

With reference to FIG. 10, there is provided a method for authenticating a user of an online service that may comprise receiving a first machine fingerprint from a computer being used by the user (step 1002). The first machine fingerprint may be generated from machine information regarding at least one of hard disk volume name, hard disk initialization date, processor type, and/or software serial number. The first machine fingerprint may be based at least in part on the IP address of the computer. At step 1004, online profile information of the user for the online service may be received. The first machine fingerprint may be associated with the received online profile information (step 1006). An authentication request signal may be received from the user (step 1008), wherein the request signal comprises a second machine fingerprint. At step 1010, the method may comprise determining whether the second machine fingerprint matches the first machine fingerprint. If so, a registered user signal may be transmitted to a server hosting the online service (step 1012), the registered user signal comprising instructions for the server to include a registered status indicator in the user's online profile information. If the second machine fingerprint does not match the first machine fingerprint, another appropriate user registration signal may be sent to the server hosting the online service at step 1012, resulting in the display of the appropriate registered status indicator (see FIGS. 4 and 5). The foregoing steps may be encoded as executable instructions in a computer-readable media, such as, for example, in a hard drive or in a portable media, such as an optical disk, electronic memory device, or magnetic tape, disk, or the like.

In accordance with one or more aspects of the embodiments described herein, there is provided a computer-implemented method for controlling access to web content (or web site services). For example, the method may involve, for a user using a machine to attempt to access the web content, providing an opportunity to create a device identifier. The method may involve, on a computer, in response to the user opting to create the device identifier, gathering information regarding platform parameters of the machine and generating a unique device identifier based at least in part on the platform parameters.

The method may further involve storing the generated device identifier on the machine as a key file, and storing the generated device identifier at a remote site as a remote key file or the like. When the user attempts to access the web content, the method may involve: comparing the key file on the user's machine with the remote key file; and allowing access to the web content if the key file on the user's machine matches the remote key file.

In accordance with one or more aspects of the embodiments described herein, there is provided a computer-implemented method for verifying an online identity. For example, the method may involve, for a user using a machine to attempt to access a social networking site, providing an opportunity to create a device identifier. In response to the user opting to create the device identifier, the method may involve gathering information regarding platform parameters of the machine and generating a unique device identifier based at least in part on the platform parameters.

The method may further involve storing the generated device identifier on the machine as a key file, and storing the generated device identifier at a remote site as a remote key file or the like. When the user attempts to access the social networking site or the like, the method may involve: comparing the key file on the user's machine with the remote key file; and allowing access to the social networking site if the key file on the user's machine matches the remote key file.

In accordance with one or more aspects of the embodiments described herein, there is provided a client-side system for authenticating a user of an online service. For example, the system may comprise a first electrical component for retrieving data regarding an online profile of the user for the online service, and a second electrical component for collecting machine information regarding a network device, the collected machine information comprising at least one user-configurable parameter and at least one non-user-configurable parameter. The system may comprise a third electrical component for generating a device identifier based at least in part on the collected machine information, and a fourth electrical component for storing the generated device identifier in a hidden file directory of the network device. The system may comprise a fifth electrical component for transmitting the generated device identifier and the retrieved online profile data to an authentication server or the like.

In accordance with one or more aspects of the embodiments described herein, there is provided a server-side system for authenticating a user of an online service. For example, the system may comprise a first electrical component for receiving a first device identifier from a network device being used by the user, the first device identifier being generated from at least one user-configurable parameter and at least one non-user-configurable parameter of a client-side network device. The system may comprise a second electrical component for receiving online profile information of the user for the online service.

The system may comprise a third electrical component for associating the first device identifier with the received online profile information, and a fourth electrical component for receiving an authentication request signal from the user, the request signal comprising a second device identifier. In response to the second device identifier matching the first device identifier, the system may comprise a fifth electrical component for transmitting a registered user signal to a server hosting the online service, the registered user signal comprising instructions for the server to include a registered status indicator in the user's online profile information.

While the present invention has been illustrated and described with particularity in terms of preferred embodiments, it should be understood that no limitation of the scope of the invention is intended thereby. Features of any of the foregoing methods and devices may be substituted or added into the others, as will be apparent to those of skill in the art. It should also be understood that variations of the particular embodiments described herein incorporating the principles of the present invention will occur to those of ordinary skill in the art and yet be within the scope of the invention.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

It is understood that the specific order or hierarchy of steps in the processes disclosed herein is an example of exemplary approaches. Based upon design preferences, it is understood that the specific order or hierarchy of steps in the processes may be rearranged while remaining within the scope of the present disclosure. The accompanying method claims present elements of the various steps in sample order, and are not meant to be limited to the specific order or hierarchy presented.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical discs (e.g., compact disc (CD), digital versatile disc (DVD), etc.), smart cards, and flash memory devices (e.g., Erasable Programmable Read Only Memory (EPROM), card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Those skilled in the art will further appreciate that the various illustrative logical blocks, modules, circuits, methods and algorithms described in connection with the examples disclosed herein may be implemented as electronic hardware, computer software, or combinations of both. To clearly illustrate this interchangeability of hardware and software, various illustrative components, blocks, modules, circuits, methods and algorithms have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

What is claimed:

1. A computer-implemented method for authenticating a user of an online service, comprising:
   retrieving, by a network device, data regarding an online profile of the user for the online service, the network device being used by the user to access the online service;
   collecting, by the network device, machine information regarding the network device, the collected machine information comprising at least one user-configurable parameter and at least one physical non-user-configurable property of the network device, wherein the at least one physical non-user-configurable property comprises a carbon and/or silicon degradation characteristic of a network device component;
   generating a device identifier based at least in part on the collected machine information;
   storing the generated device identifier in a hidden file directory of the network device; and
   transmitting the generated device identifier and the retrieved online profile data to an authentication server.

2. The method of claim 1, further comprising, in response to the generated device identifier matching a known identifier, receiving a registered user signal from the authentication server.

3. The method of claim 2, wherein the registered user signal comprises instructions for an online service server to include a registered status indicator in the user's online profile information.

4. The method of claim 3, wherein the registered status indicator is based at least in part on past behavior or reputation associated with the user.

5. A non-transitory computer readable medium comprising executable code for a Java Virtual Machine (JVM) to:
   retrieve data regarding an online profile of a user for an online service;
   collect machine information regarding a network device being used by the user to
   access the online service, the collected machine information comprising at least one user-configurable parameter and at least one physical non-user-configurable property of the network device, wherein the at least one physical non-user-configurable property comprises a carbon and/or silicon degradation characteristic of a network device component;
   generate a device identifier based at least in part on the collected machine information;
   store the generated device identifier in a hidden file directory of the network device; and
   transmit the generated device identifier and the retrieved online profile data to an authentication server.

6. The non-transitory computer readable medium of claim 5, further comprising executable code for the JVM to, in response to the generated device identifier matching a known identifier, receive a registered user signal from the authentication server.

7. The non-transitory computer readable medium of claim 6, wherein the registered user signal comprises instructions for an online service server to include a registered status indicator in the user's online profile information.

8. The non-transitory computer readable medium of claim 7, wherein the registered status indicator is based at least in part on past behavior or reputation associated with the user.

9. A computer-implemented method for authenticating a user of an online service, comprising:
   receiving, by an authentication server, a first device identifier from a network device being used by the user, the first device identifier being generated from at least one user-configurable parameter and at least one physical non-user-configurable property of the network device, wherein the at least one physical non-user-configurable property comprises a carbon and/or silicon degradation characteristic of a network device component;
   receiving, by the authentication server, online profile information of the user for the online service;
   associating the first device identifier with the received online profile information;
   receiving an authentication request signal from the user, the request signal comprising a second device identifier; and
   in response to the second device identifier matching the first device identifier, transmitting a registered user signal to a server hosting the online service, the registered user signal comprising instructions for the server to include a registered status indicator in the user's online profile information.

10. The method of claim 9, wherein the registered status indicator is based at least in part on past behavior or reputation associated with the user.

11. A computer program product, comprising:
   a non-transitory computer-readable medium comprising code for:
   receiving a first device identifier from a network device being used by a user, the first device identifier being generated from at least one user-configurable parameter and at least one physical non-user-configurable property of the network device, wherein the at least one physical non-user-configurable property comprises a carbon and/or silicon degradation characteristic of a network device component;
   receiving online profile information of the user for the online service;
   associating the first device identifier with the received online profile information;
   receiving an authentication request signal from the user, the request signal comprising a second device identifier; and
   in response to the second device identifier matching the first device identifier, transmitting a registered user signal to a server hosting an online service, the registered user signal comprising instructions for the server to include a registered status indicator in the user's online profile information.

12. The computer program product of claim 11, wherein the registered status indicator is based at least in part on past behavior or reputation associated with the user.

13. A computer-implemented method for authenticating a user of an online service, comprising:

retrieving, by a network device, machine information regarding the network device, the machine information comprising at least one user-configurable parameter and at least one physical non-user-configurable property of the network device, wherein the at least one physical non-user-configurable property comprises a carbon and/or silicon degradation characteristic of a network device component;

generating a device identifier based at least in part on the retrieved machine information; and transmitting the generated device identifier to an authentication server.

* * * * *